United States Patent
Mittelstadt (10) Patent No.: US 9,692,213 B2
(45) Date of Patent: Jun. 27, 2017

(54) DOORLESS MODULAR PANELBOARD

(71) Applicant: SCHNEIDER ELECTRIC USA, INC., Palatine, IL (US)

(72) Inventor: Chad R. Mittelstadt, Cedar Rapids, IA (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 14/802,700

(22) Filed: Jul. 17, 2015

(65) Prior Publication Data
US 2017/0018911 A1    Jan. 19, 2017

(51) Int. Cl.
*H02B 1/20* (2006.01)
*H02B 1/04* (2006.01)
*H02B 1/24* (2006.01)
*H02B 1/056* (2006.01)

(52) U.S. Cl.
CPC .............. *H02B 1/20* (2013.01); *H02B 1/04* (2013.01); *H02B 1/056* (2013.01); *H02B 1/24* (2013.01)

(58) Field of Classification Search
CPC . H02B 1/056; H02B 1/06; H02B 1/20; H02B 1/21; H02B 1/04; H02B 1/03; H01H 71/08; H01H 71/0271; H01H 9/342; H01H 71/1009; H01H 89/06; H01H 71/1045; H01H 71/405; H01H 71/0264; H02H 1/0015
USPC .................................. 361/634–640, 644–656
See application file for complete search history.

(56) References Cited

U.S. PATENT DOCUMENTS

| | | | | |
|---|---|---|---|---|
| 3,192,446 A * | 6/1965 | Meacham | .............. | H02B 1/056 361/634 |
| 3,588,620 A * | 6/1971 | Wasileski | .............. | H02B 1/056 174/72 B |
| 4,251,851 A * | 2/1981 | Diersing | ................ | H02B 1/056 361/634 |
| 4,472,761 A * | 9/1984 | Koslosky | ................. | H02B 1/21 361/638 |
| 4,789,344 A * | 12/1988 | Fritsch | ................. | H01R 25/142 439/114 |
| 4,918,258 A | 4/1990 | Ayer | | |
| 5,046,173 A * | 9/1991 | Wall, Jr. | ................. | H02B 1/056 361/634 |
| 6,381,123 B1 * | 4/2002 | Gerken | ................. | H02B 1/056 361/652 |

(Continued)

*Primary Examiner* — Adam B Dravininkas
(74) *Attorney, Agent, or Firm* — Locke Lord LLP (57) ABSTRACT

A panelboard is composed of modular units. Each unit has compartments for circuit breakers, side walls, and wiring gutters. A main circuit breaker unit has a main cable compartment having separate compartmentalized routing for power cables, and a compartment for the main breaker. A branch circuit breaker unit is edge connected to the main breaker unit. More branch breaker units may be added. Each branch breaker unit has a bus plane for line power, with pin-shaped stabs extending perpendicularly from its busses. The bus plane is covered by circuit breaker compartments in front and an insulative backplane in back. Branch wiring exit slots in the circuit breaker compartments lead to wiring gutters. Each unit is shaped and dimensioned to be mechanically and electrically connected together to form the whole panelboard. Caps for the wiring gutters are front accessible and constitute a front surface of the finished panelboard.

9 Claims, 7 Drawing Sheets

(56) References Cited

U.S. PATENT DOCUMENTS

| | | | |
|---|---|---|---|
| 2008/0084655 A1* | 4/2008 | Ranta | H02B 1/056 361/641 |
| 2011/0149483 A1* | 6/2011 | Diaz | H02B 1/20 361/637 |
| 2013/0153541 A1* | 6/2013 | Monahan | H02B 13/025 218/155 |
| 2013/0164961 A1* | 6/2013 | Diaz | H02B 1/056 439/214 |
| 2014/0315401 A1* | 10/2014 | Blasbalg | H01R 25/161 439/110 |

* cited by examiner

DOORLESS MODULAR PANELBOARD

FIELD OF THE INVENTION

The present disclosure relates to methods and systems for constructing panelboards and particularly panelboards of the type with reduced chances of exposure to live parts in the panelboard.

BACKGROUND OF THE INVENTION

An electrical panel or panelboard, has a main bus and individual connection points on the bus that are connectable to electrical devices, such as circuit breakers for branch conductors and any other electrical devices designed to be installed for a branch circuit. Because the circuit breakers, sometimes referred to herein simply as "breakers" for convenience, and other branch electrical devices are typically mounted directly to the panelboard, an operator and/or tools may come in contact with exposed conductors in the panelboard when installing or removing the circuit breakers from the panelboard. Thus, it is recommended that power be shut off to the panelboard as a precaution when electrical devices are being installed or removed. However, it may be considered desirable in some cases to keep the panelboard energized to prevent an electrical hazard as a consequence of deenergization, or operators may intentionally keep the power on in the interest of saving time. Moreover, shutting off power to the panelboard can be a major inconvenience, especially for data centers, hospitals, and other critical applications that require a high availability power source.

A need exists for an improved way to safely insert and remove a circuit breaker or other switching equipment from an electrical panel as part of a larger scheme for installing and removing branch circuit devices without deenergizing the electrical panel. Measures to prevent unintentional contact with live, i.e. energized, conductors are often known as "finger safe" provisions. Work on energized equipment will be known herein as "live work". Particular panelboards, oftentimes called load centers, are front-accessible, wall-mounted panelboards, and typically for low voltage light, heat or power circuits in residential applications, which have miniature circuit breakers to define and protect each branch circuit. Due to their size, design, and economic constraints, load center-type panelboards can present unique challenges for the above considerations. Further, it is desirable that production and installation of panelboards be made economical, flexible and simple wherever possible while their use and operation remain as safe as possible.

SUMMARY OF THE DISCLOSED EMBODIMENTS

The embodiments disclosed herein are directed to methods and apparatus for modular construction of a panelboard designed for reducing or eliminating the possibility of exposure to live parts in a panelboard, as well as reduction of arcing incidents and attendant risks; and particularly in the load center variety of panelboard. A panelboard and complementary circuit breaker of this type are illustrated and described in Applicant's concurrent U.S. patent application Ser. Nos. 14/802,483 and 14/802,574, which are incorporated by reference herein in their entirety. While the illustrated embodiments are explained in relation to an exemplary three phase panelboard using plug on miniature circuit breakers, and the terms "load center" and "panelboard" may sometimes be used interchangeably herein, the present invention may not necessarily be limited to the plug on miniature circuit breaker load center environment.

The disclosed embodiments provide panelboards composed of modular units. Each unit has at least one compartment for a circuit breaker, side walls, and wiring gutters. A main circuit breaker unit has a main cable compartment having separate compartmentalized routing for power cables, and a compartment for the main breaker. A branch circuit breaker unit is edge connected to the main breaker unit. More branch breaker units may be added as modules. Each branch circuit breaker unit has a bus plane for line power, with pin-shaped stabs extending perpendicularly from its busses. The bus plane is covered by circuit breaker compartments on top and an insulator back plane at the bottom. Branch wiring exit slots in the circuit breaker compartments lead to wiring gutters. Each unit is shaped and dimensioned to be mechanically and electrically connected together to help form the panelboard as a whole. Caps, i.e. removable covers, for the wiring gutters are front accessible and constitute a front surface of the finished panelboard.

Some aspects of the invention will comprise a panelboard constructed from modular circuit breaker units, comprising: each circuit breaker unit forming side walls and branch wiring gutters for the panelboard, and having a nonconductive backplane, each circuit breaker unit being shaped and dimensioned to be mechanically and electrically connected together to form the panelboard, each circuit breaker unit having removable caps for the wiring gutters which are front accessible and constitute a front surface of the finished panelboard, and the circuit breaker units including: a main circuit breaker unit with a main cable compartment having separate compartmentalized routing for incoming power cables, a compartment for the main circuit breaker; and at least a removable cap for the main circuit breaker compartment. One or more modular branch circuit breaker units are connectable to the main circuit breaker unit and other branch circuit breaker units, the branch circuit breaker unit having: branch circuit breaker compartments, a bus plane carrying busses with pin-shaped stabs for line power, the bus plane covered substantially on top by the branch circuit breaker compartments with the pin-shaped stabs protruding into the branch circuit breaker compartments, and a nonconductive backplane beneath the bus plane. The branch circuit breaker compartments have branch wiring exits slots leading to the wiring gutters; and have no covering panel for circuit breaker faces installed in the branch circuit breaker compartments. In some aspects of the invention the panelboard may further be fitted with a modular digital section having communication or processing equipment, or both, for the panelboard.

In another aspect, the disclosed embodiments are directed to particular aspects of the branch circuit breaker units in the panelboard assembly, including a power bus in a first plane with vertical stabs extending 90-degrees from the power bus in a first axis; a neutral bus in the first plane with vertical stabs extending 90-degrees from the neutral bus in the first axis; the stabs of each of the power bus and the neutral bus being arranged in a respective line; the stabs having a free end being distal from the busses, the free ends having caps of nonconductive material and extending through a nonconductive layer; circuit breaker compartments for receiving circuit breakers inserted along the first axis; the circuit breaker compartments overlaying the nonconductive layer and having the stabs protruding therein; a shutter plate in each of the circuit breaker compartments, each shutter plate having a throughhole for receiving a stab of the power bus and a throughhole for receiving a stab of the neutral bus; and the shutter plate having a raised position overlaying all pin-shaped stabs in a circuit breaker compartment and having a lowered position allowing the stabs of the circuit breaker compartment to protrude therethrough. Some aspects of the invention provide that all circuit breakers in the panelboard are compartmentalized, i.e. sequestered, from the other breakers and any surrounding conductors to reduce the chance of arcing incidents. Other aspects provide that all terminal connections to the branch breakers are "covered," i.e. internal to the branch circuit breaker to further reduce the chance of contact with live conductors and arcing events. The plug on branch breakers provided are complementary to the underlying panelboard and made to operate movable shutters over the pin-shaped stabs which are keyed to be opened by the branch breaker case upon insertion of the breaker. The breakers are preferably equipped with positive retention interlocks providing a hold down mechanism and an interlock which will not allow the breaker to be inserted to, or removed from, the compartment in the ON position. Such interlocks were illustrated previously in Applicant's U.S. patent application Ser. No. 14/449,881. The main circuit breaker unit and branch circuit breaker units each have front accessible covers for branch wiring gutters. These covers are removable access panels/caps and which form front surfaces of the panelboard. In the main breaker unit, the main circuit breaker compartment is covered with a removable and front-accessible cover separate from the branch wiring gutter covers. The cable compartment section of the unit may have a separate cover. Conversely, the branch breaker units may be left uncovered at the front of the panelboard, because there are no exposed conductors in the panelboard and the chance of arcing or accidental contact with conductors has been practically eliminated.

According to the invention the builder or installer may attain flexible production of panelboards while the separate covers allow for increased safety of operation.

BRIEF DESCRIPTION OF THE DRAWINGS

The foregoing and other advantages of the disclosed embodiments will become apparent upon reading the following detailed description and upon reference to the exemplary explanatory drawings offered to illustrate the invention according to one or more embodiments disclosed herein, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figures 1A, 1B:
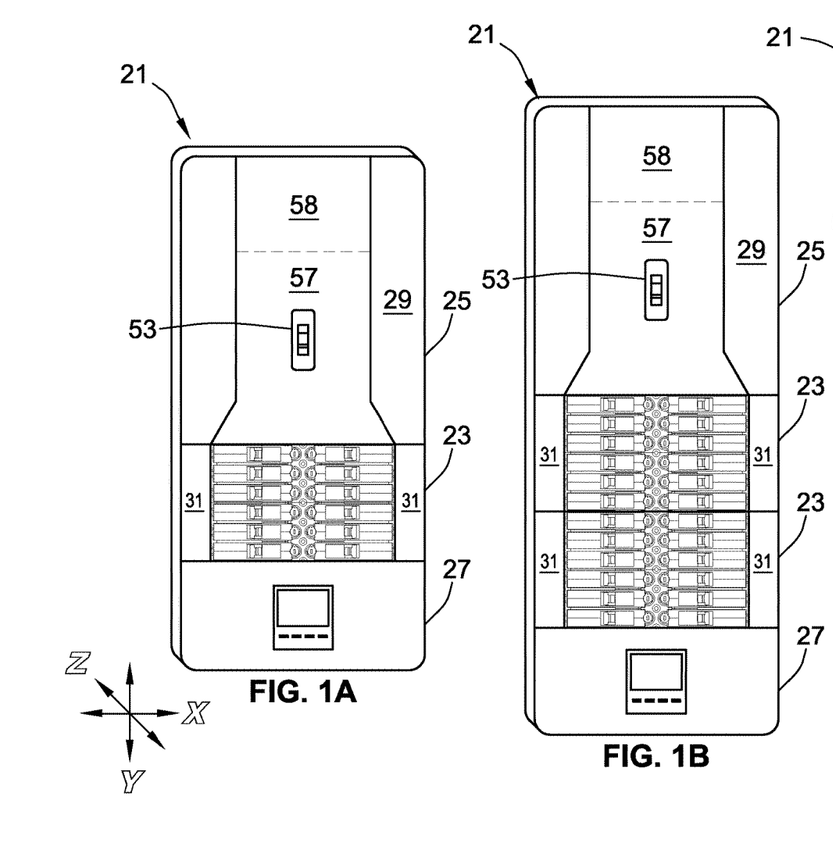
FIGS. 1A, 1B, and 1C show from views of exemplary panelboards with one two and three branch circuit breaker units, respectively, according to one or more embodiments disclosed herein.
Figure 1C:
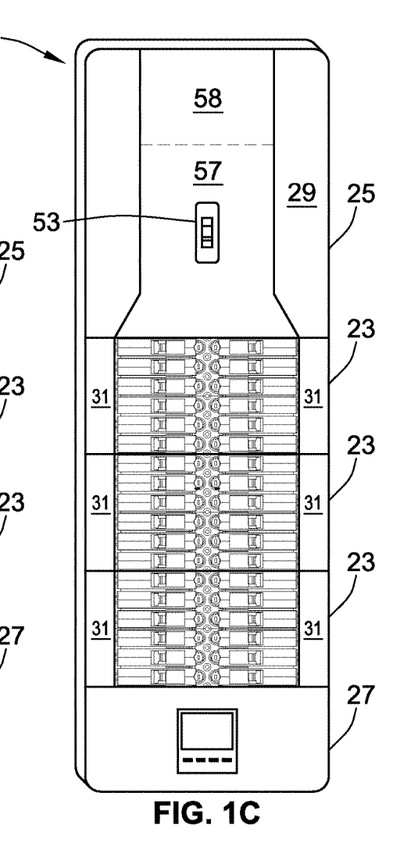

Referring now to FIGS. 1A, 1B and 1C, panelboards, collectively 21, are shown in front views according to exemplary embodiments. FIG. 1A shows a load center 21 with a single branch circuit breaker unit 23, a main circuit breaker unit 25 and a digital section 27. The exemplary branch circuit breaker unit has two columns of six branch breakers in its module. The load center 21 shown in FIG. 1B contains two branch circuit breaker units collectively 23, while the load center shown in FIG. 1C contains three branch circuit breaker units, collectively 23. As further explained below, each circuit breaker unit, i.e. main circuit breaker units 25 and branch circuit breaker units 23 are equipped with front accessible and removable caps, 29 and 31 respectively, covering the branch wiring gutters of their respective units and forming a portion of the front surface of the finished panelboard 21. The caps are generally composed of nonconductive, nonflammable material and may be hinged, snapped on, held by quarter turn fasteners, or otherwise mechanically fastened in any suitable fashion to the underlying panelboard unit. As further discussed below, the branch circuit breaker unit does not require a cap over the front faces of the branch circuit breakers.

Figure 2:
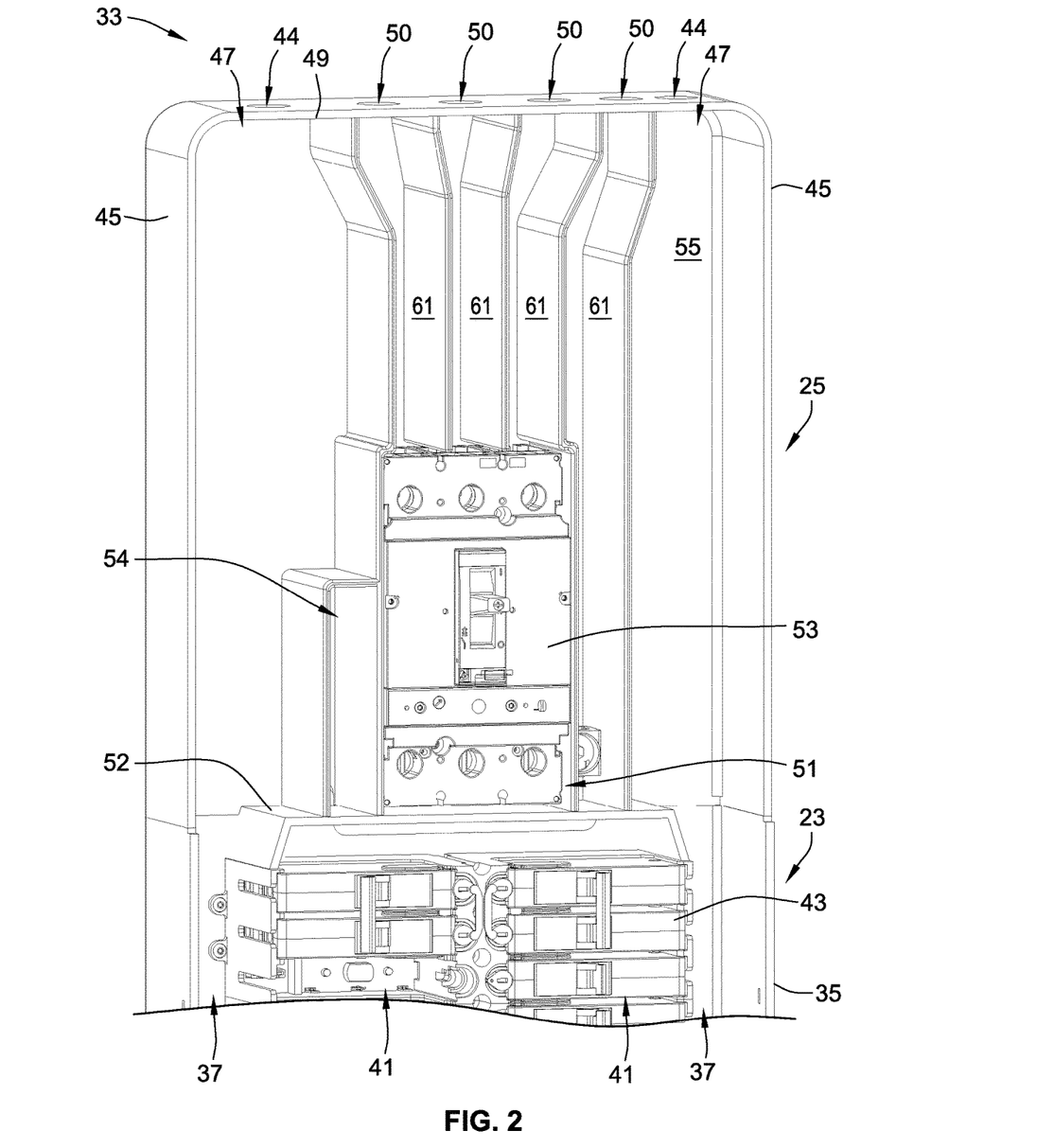
FIG. 2 shows a front perspective view of an exemplary main circuit breaker unit with a main cable compartment, and a main circuit breaker compartment, as joined to a branch circuit breaker unit with miniature branch circuit breakers therein, each circuit breaker unit, main and branch, providing gutter space for the branch wiring.
Figure 3A:
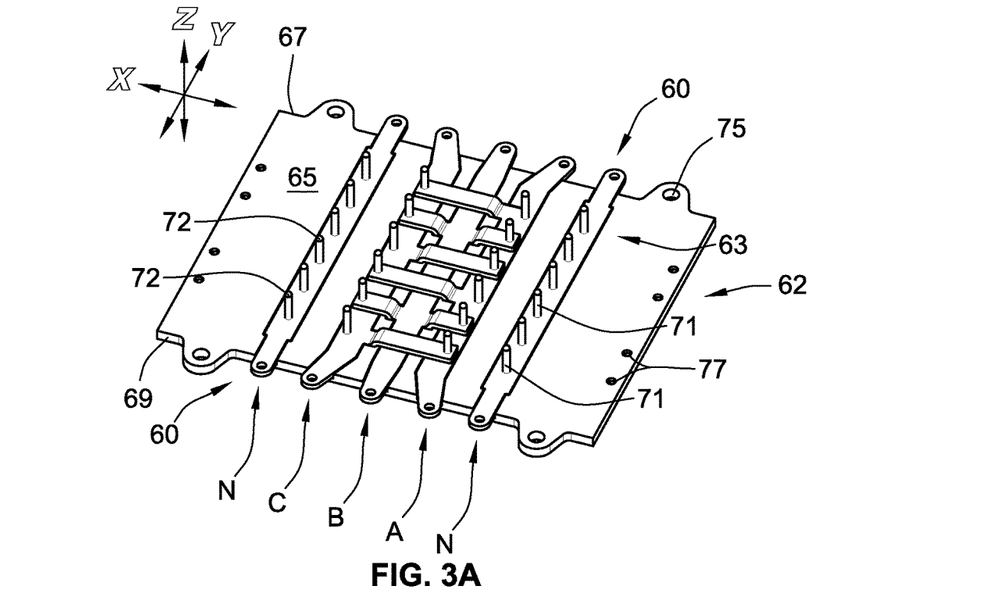
FIGS. 3A-3C are top perspective views showing various components and construction stages for an exemplary branch circuit breaker unit.
Figure 3B:
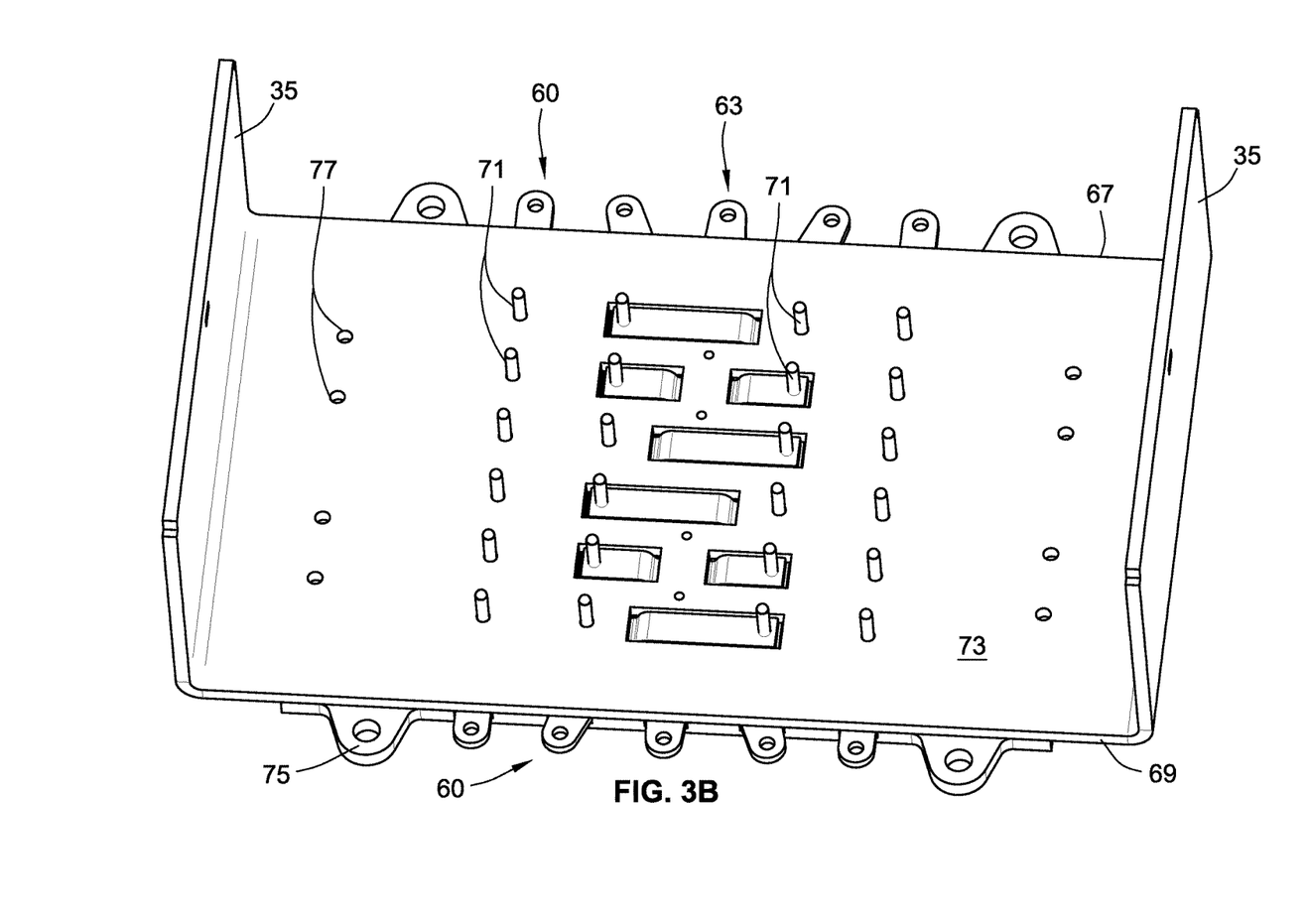
Figure 3C:
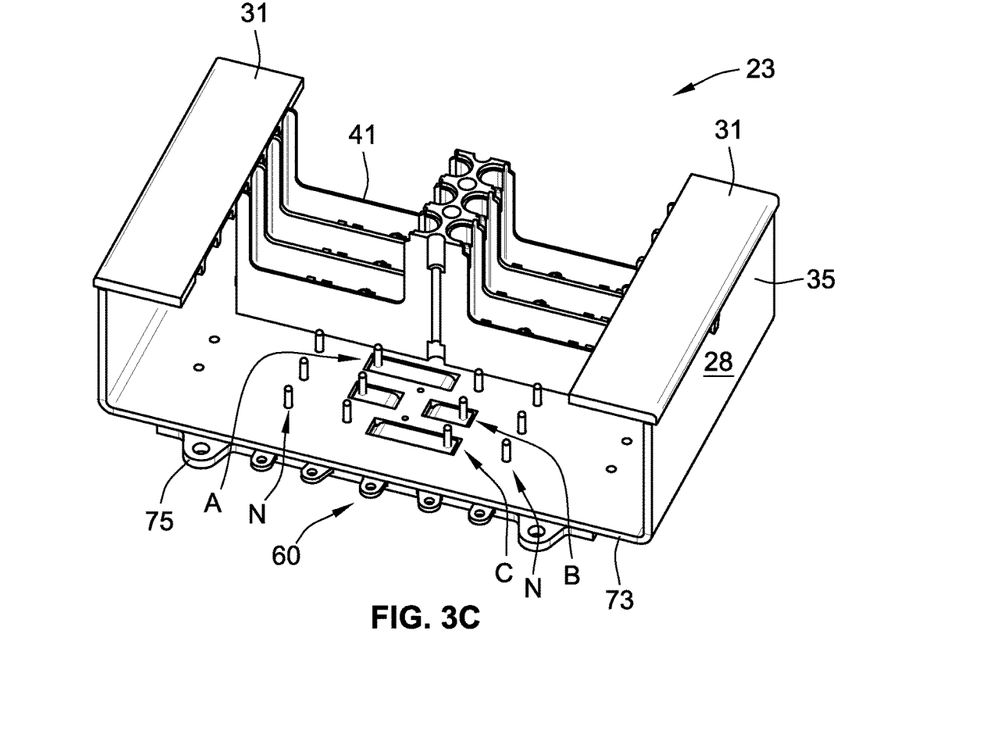

FIG. 2 shows a front perspective view of a partially constructed panelboard 33 comprising a joined main circuit breaker unit 25 and a cutaway circuit breaker unit 23 at their junction. Each branch circuit breaker unit has side walls 35 forming a portion of the side exterior walls of the panelboard 33 and forming one wall of the wiring gutters 37 for branch wiring of the panelboard. The interior of each branch circuit breaker unit 23 is otherwise occupied by circuit breaker compartments 41 for the branch breakers, collectively 43, as further explained below. Filler plates (not shown) can be applied to cover unused breaker compartments. The main circuit breaker unit 25 has side walls 45 also forming a portion of the side exterior walls of the panelboard 33 and forming one wall of the wiring gutters 47 which align with the branch circuit breaker wiring gutters 37 when the units are joined. The main circuit breaker unit 25 is further equipped with an upper end wall 49 to form the top of the panelboard enclosure. The interior of the main circuit breaker unit 23 is otherwise occupied by a main circuit breaker compartment 51 for surrounding the main breaker 53 on its four sidewalls. Alternatively, as shown, a space may be left open within the downstream side of the main circuit breaker compartment 51 and later closed by a wall 52 at the top of the branch circuit breaker unit 23 to maintain sequestration of the main breaker 53. Electrical connection from the load side of the main circuit breaker 53 to the busses of the branch breaker unit 23 can be done by conductive straps in any suitable fashion as further explained below. A nonconductive backplane 55 of the main circuit breaker compartment abuts the back wall of the main breaker 53. A removable main breaker top cover 57 (FIGS. 1A-1C) forms a sixth side to make an arc resistant enclosure for the main breaker 53 and forms another portion of the front exterior surface of the panelboard 21. Another arc resistant feature within the main circuit breaker compartment is the main cable compartment 59 having separate compartmentalized routing for incoming power cables, here shown with four cable chambers formed by five routing walls, collectively 61, perpendicular to the nonconductive backplane 55 with the ends of the routing walls contiguous with the upper end wall 49 on either side of entry knockouts 50 for incoming power cables (not shown). Additional knockouts 44 can be provided in the upper end wall 49 over the wiring gutters 47 for branch wiring egress from the panelboard. The routing walls 61 are contacted preferably by a separately removable main cable compartment top cover 58 to also limit any arcing activity of the line side power cables entering the panelboard. Mechanical joinery between modular units 23, 25 is preferably done at the nonconductive backplane surfaces in any appropriate fashion to further reduce the chance of arcing incidents In FIGS. 3A-3C, construction of an exemplary branch circuit breaker unit 23 is shown. In FIG. 3A the bus plane 62 carries an exemplary bus system is a three phase incoming line power bus system having an A phase, a B phase, a C phase, and one neutral bus N on each side, as will be understood by those in the art, to accommodate a two row branch breaker layout as best seen in FIG. 3C. The branch circuit breaker unit 23 provides a three phase bus assembly with bus edge-connectors 60 at one or both of upper 67 and lower 69 edges of the unit, depending on the intended number of units and their positioning for constructing the panelboard. The bus edge connectors 60 extend beyond the edges of the backplane 65 and are perforated for accepting bolted connections to other conductors. It will be understood that other forms of connection may be employed. As seen in FIG. 3A, the busses, collectively 63, of the branch circuit breaker unit 23, are affixed to a nonconductive backplane 65 extending in the X-Y plane. Each bus has a Y axis line of pin-shaped stabs, collectively 71, extending in the Z axis, i.e. vertically. Each stab 71 is capped with a nonconductive cap 72 at its free end, as mentioned above. It will be appreciated that various arrangements of the bus structure may be possible dependent upon factors such as the phases of power to be delivered through the load center, etc. The busses are then preferably covered with a nonconductive material, e.g. epoxy, or an insulative plate 73, (FIG. 3B) which has been perforated with holes to allow the stabs 57 to protrude therethrough into the circuit breaker compartments 41. The insulative plate 73 also forms the branch circuit breaker unit sidewalls 35 and is equipped with appropriate mechanical joinery features such as perforate end tabs 75 and through-holes 77 for fastening the branch circuit breaker compartment 41 to the plate 73. It is envisioned that the insulative plate 73 and a unitary circuit breaker compartment structure 41 could be formed as a single unit in some aspects of the invention. The stabs 71 within the circuit breaker compartments are then covered with the shutter plates 103 (FIG. 6), as further explained below, such that the free ends of the stabs, preferably including the nonconductive caps 72, rest below the upper surface of the shutter plates so as to allow access to the stabs when the shutter plates are depressed by circuit breaker insertion. Removable caps 31 for the wiring gutters 37 formed between the circuit breaker compartment and sidewalls 35 are shown as snapped to the branch circuit breaker unit 23 in FIG. 3C.

Figure 4:
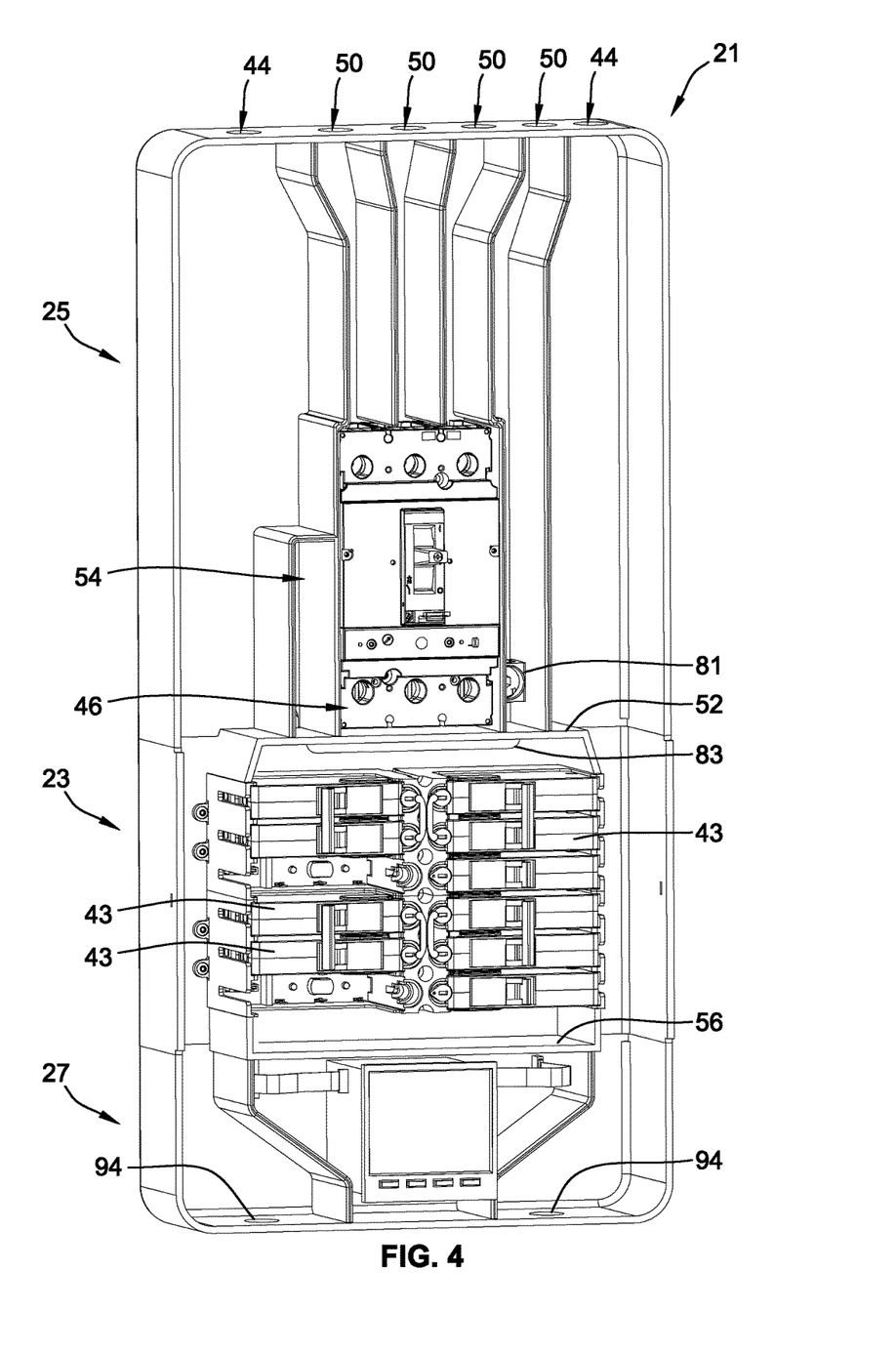
FIG. 4 is a front perspective view of a panelboard, without caps in place, showing the main circuit breaker unit, the branch circuit breaker unit, and the digital section all connected.

FIG. 4 shows a front perspective view of a panelboard without covering caps in place, showing the main CB unit 25 connected to a branch CB unit 23 and the digital section 27. Perforate bus-to-breaker terminal straps (hidden) can bridge the load side conductive lugs 46 of the main circuit breaker 83 to the bus edge-connectors 60 (FIG. 3A) of the branch circuit breaker unit 23 and be held in place by bolted connections through the perforations. The two neutral busses, left and right, (N, FIG. 3A) of the branch circuit breaker unit 23 can be connected by a neutral connecting strap 83. The neutral connecting strap 83 of the branch circuit breaker unit can be connected to the neutral cable lug 81 of the main circuit breaker unit by a connecting strap (also hidden) similar to the perforate bus-to-breaker terminal straps used between the main breaker and the branch circuit breaker unit bus edge connectors. An arc damping chamber 54 is provided in the main circuit breaker unit 25 to surround the left side neutral bus connection. The branch circuit breaker unit 23 contains a top end-wall 52 and a bottom end wall 56 that provide arc damping barriers between its branch breakers 43 and the main breaker 53 and interior of the digital section 27, respectively.

Figure 5:
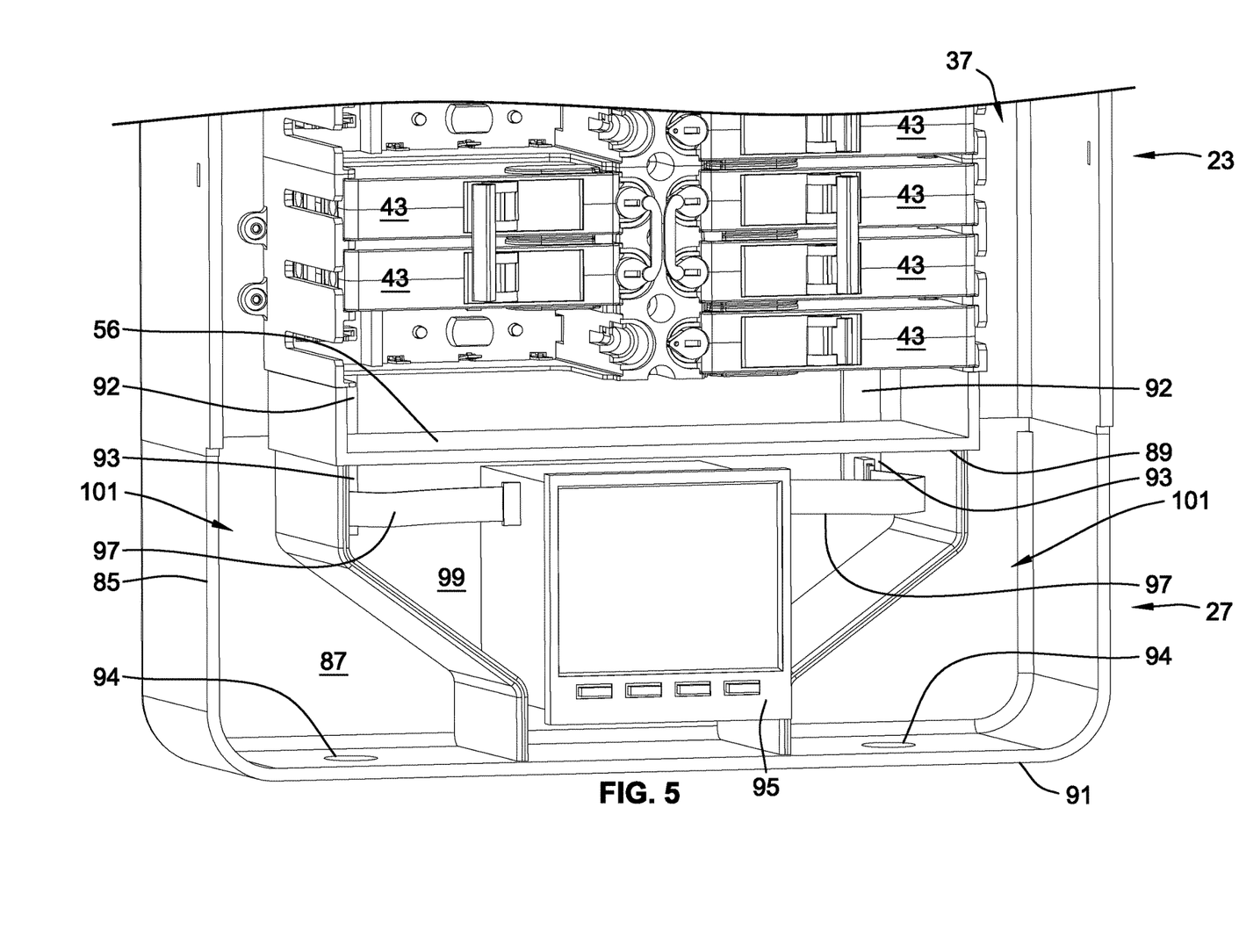
FIG. 5 is a front perspective view of the interior of an exemplary digital section for the modular panelboard.

FIG. 5 shows an interior detail of the digital section 27 at the lower edge of a branch circuit breaker unit 23. The exemplary digital section 27 comprises a pan-shaped structure open to the branch circuit breaker unit 23 at their boundary, with side walls 85, a nonconductive backplane 87, and a lower end wall 91 forming an exterior bottom wall of the completed panelboard 21 (FIGS. 1A-1C). Left and right side communication rails 93 communicate with their counterparts 92 in the branch circuit breaker unit carrying information or power, or both, to a data harvester 95 for collecting measurements from each branch device such as the branch breakers and the processing, storage, and handling of such measurements if desired. Communication apparatus may be contained in the digital section for transfer of the collected measurements or related data. The data harvester 95 is shown connected to the communication rails 93 by ribbon cables 97. The data harvester can be contained in a central compartment 99 whose walls also form wiring gutters 101 between the central compartment 99 and the side walls 85. The wiring gutters 101 are contiguous with the wiring gutters 37 of the branch circuit breaker unit 23. Knockouts 94 can be provided in the lower end wall 91 for branch wiring egress from the panelboard. Mechanical joinery to the branch circuit breaker unit 23 is again by any suitable fashion and preferably at the nonconductive backplanes of the panelboard modules.

Figure 6:
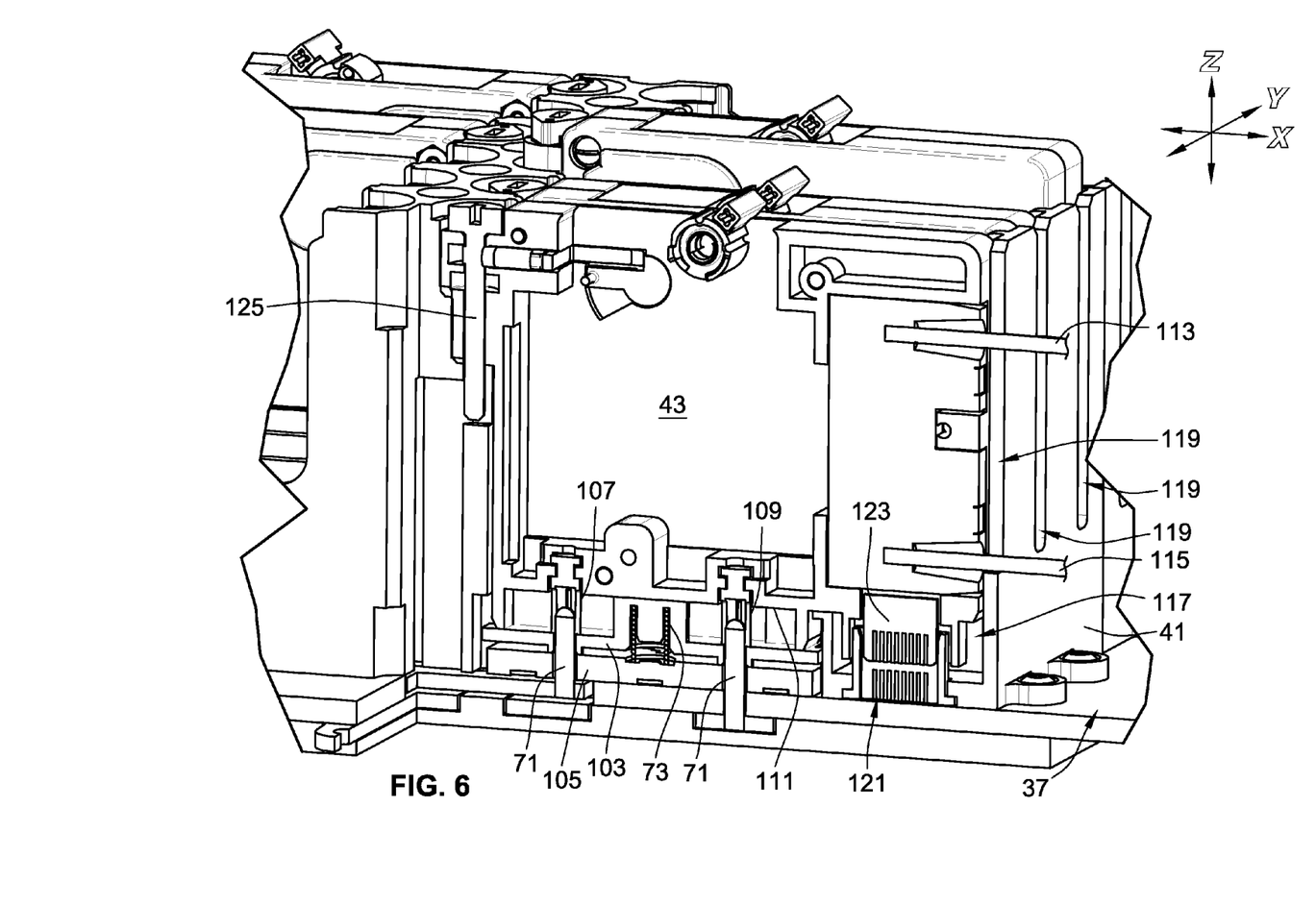
FIG. 6 shows a medial sectional perspective through the X-Z plane of a circuit breaker compartment of the branch circuit breaker unit including: an exemplary shutter assembly, a circuit breaker in engagement with the bus structure; a deep well circuit breaker compartment, and a wiring gutter.

As seen in FIG. 6, and as more fully described in the applicant's concurrent application Ser. No. 14/802,483, once the circuit breaker 43 is fully inserted with a Z axis motion, a shutter plate 103 is fully depressed in the Z axis to a bottom plate 105 of the circuit breaker compartment structure 41 thereby allowing a line terminal 107 and neutral female terminal 109 inside the bottom surface 111 of the circuit breaker 43 to make electrical contact with the vertical pin shaped stabs 71. Appropriate shaping of the bottom surfaces of the circuit breaker and the top surfaces of the shutter plate, is designed to accomplish this mating. The branch load and neutral wires 113, 115 previously attached to the breaker 43 exit the circuit breaker compartment well 117 through a slot, collectively 119, into a branch circuit breaker unit wiring gutter 37. The communication port 121 of the circuit breaker compartment well 117 has accepted the corresponding connector 123 on the circuit breaker 43 outside of the shutter plate area. The positive retention interlock 125, a securing mechanism for tenacious attachment of the circuit breakers to the circuit breaker compartments, has been fastened, securing the circuit breaker in the circuit breaker compartment well 117 and only thereafter allowing the breaker to be placed in the ON position. Once the branch circuit breakers 43 are inserted, the removable caps 31 may be fastened to the branch circuit breaker unit over the wiring gutters as seen in FIGS. 1A-1C.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the scope of the disclosed embodiments as defined in the appended claims.

What is claimed is:

1. A panelboard constructed from modular circuit breaker units, comprising:
   a) each circuit breaker unit forming side walls and wiring gutters for the panelboard, and having a nonconductive backplane;
   b) each circuit breaker unit being shaped and dimensioned to be mechanically and electrically connected together to form the panelboard;
   c) each circuit breaker unit having removable caps for the wiring gutters which are front accessible and constitute a front surface of the finished panelboard; and
   d) the circuit breaker units including:
   i) a main circuit breaker unit with a main cable compartment having separate compartmentalized routing for incoming power cables; a main circuit breaker compartment for the main circuit breaker; and a first removable cap for the main circuit breaker compartment;
   ii) a branch circuit breaker unit connectable to the main circuit breaker unit and other branch circuit breaker units, the branch circuit breaker unit having:
   branch circuit breaker compartments, the branch circuit breaker compartments having branch wiring exit slots leading to the wiring gutters;
   a bus plane carrying busses with pin-shaped stabs for line power, the bus plane covered substantially on top by the branch circuit breaker compartments with the pin-shaped stabs protruding into the branch circuit breaker compartments, and
   a nonconductive back plane beneath the bus plane.

2. The panelboard of claim 1 further having no covering panel for the faces of circuit breakers installed in the branch circuit breaker compartments.

3. The panelboard of claim 1 wherein all the branch circuit breaker units are modular.

4. The panelboard of claim 1 further comprising a digital section which is edge connected to one of the branch circuit breaker units, the digital section comprising at least one of information gathering apparatus and communication apparatus for the panelboard.

5. The panelboard the panelboard of claim 1 further comprising a main circuit breaker in the main circuit breaker compartment.

6. The panelboard of claim 1 further comprising a branch circuit breaker contained in at least one the branch circuit breaker compartments.

7. The panelboard of claim 1 further comprising a second cap separately removable from the first removable cap for the MCB unit, the second cap covering the main cable compartment.

8. The panelboard of claim 1 wherein all circuit breakers in the panelboard are sequestered from other breakers and any surrounding conductors.

9. The panelboard of claim 1 wherein all terminal connections to the branch circuit breakers are internal to the branch circuit breakers.

* * * * *